Nov. 3, 1931.   L. C. JONES   1,830,661
NONSKID DRAG FOR AUTOMOBILES
Filed Dec. 31, 1929   2 Sheets-Sheet 1
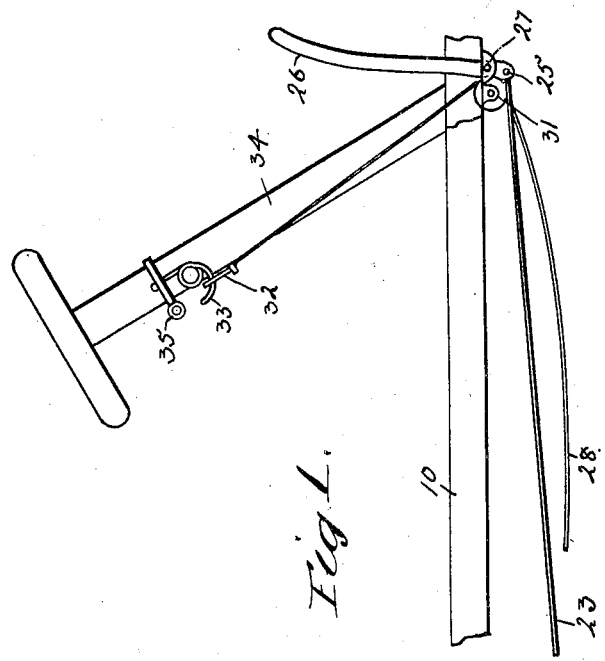
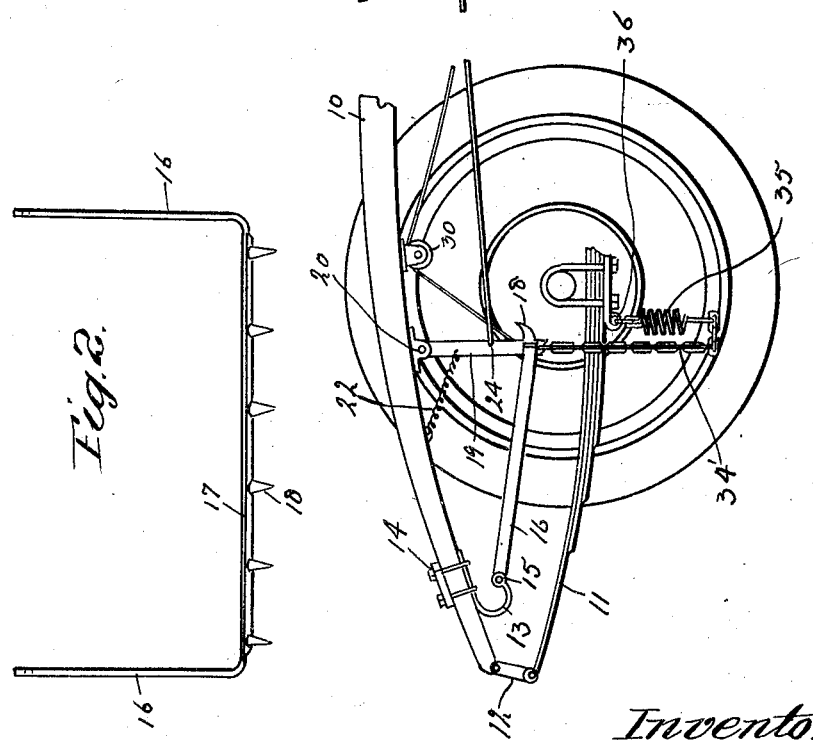
Inventor
Lewis C. Jones
By W. W. Williamson Nov. 3, 1931.  L. C. JONES  1,830,661
NONSKID DRAG FOR AUTOMOBILES
Filed Dec. 31, 1929  2 Sheets-Sheet 2
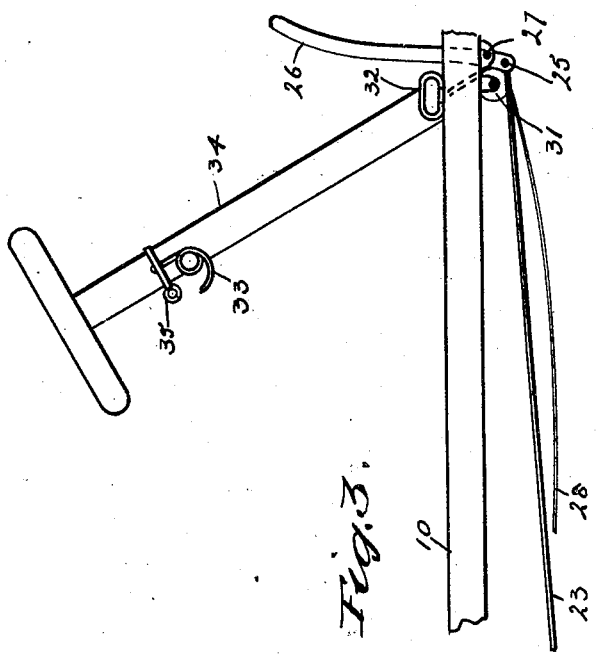
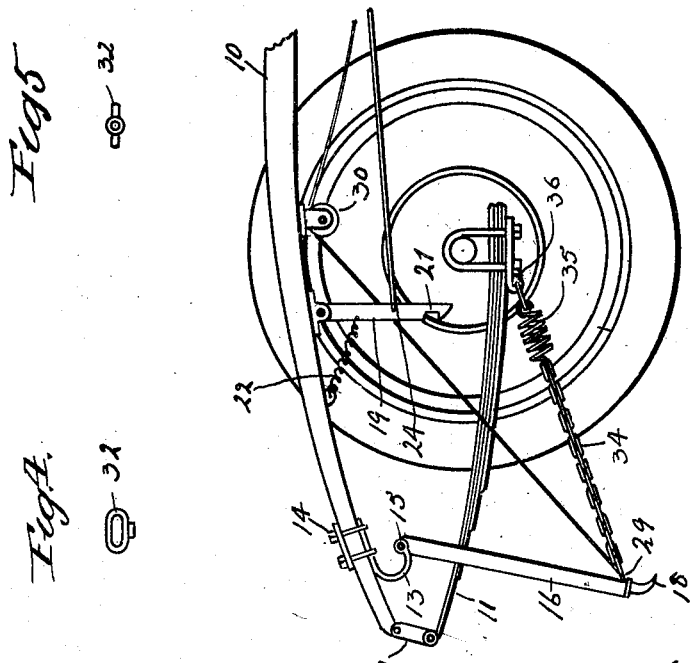
Inventor
Lewis C. Jones
By W. W. Williamson
Atty.

Patented Nov. 3, 1931

1,830,661

UNITED STATES PATENT OFFICE

LEWIS C. JONES, OF PHILADELPHIA, PENNSYLVANIA

NONSKID DRAG FOR AUTOMOBILES

Application filed December 31, 1929. Serial No. 417,647.

My invention relates to new and useful improvements in non-skid drags for automobiles being a further development of the devices shown in my United States Patent application, Serial No. 114,704, allowed July 1, 1929, and has for its object to provide an exceedingly simple and effective device of this description which may be readily applied to any standard type of automobile and when so applied will normally be held out of action and carried entirely by the body of the vehicle.

A further object of the invention is to provide for so latching the drag as to prevent rattling or chattering when the vehicle is in motion and yet permit its ready release for quick action in case of emergencies.

A still further object of the invention is to provide for conveniently returning the drag to its inoperative position and locking it in such position; and a still further object of the invention is to provide for taking up the slack in the cord or cable which is utilized for returning the drag to its inoperative position.

With these and other ends in view, this invention consists in the details of construction and combination of elements hereinafter set forth and then specifically designated by the claims.

In order that those skilled in the art to which this invention appertains may understand how to make and use the same, I will describe its construction in detail, referring by numerals to the accompanying drawings forming a part of this application, in which:—

Fig. 1 is a fragmentary elevation of the chassis of an automobile showing my improved drag applied thereto, the operating element being shown as latched in its inoperative position.

Fig. 2 is a rear view of the active element of the drag.

Fig. 3 is a view similar to Fig. 1 showing the active element of the drag in operative position after having been unlatched.

Fig. 4 is a detail view of the hand hold or ring utilized for pulling upon the cord or cable which returns the active element of the drag to its inactive position.

Fig. 5 is a bottom view of Fig. 4.

In carrying out my invention as herein embodied, 10 represents the chassis of a motor vehicle to which the rear springs 11 are shackled as at 12, only one of said springs being here shown and to each of the side bars of this chassis is secured a shock absorbing spring 13 by means of the clamp 14, said springs terminating in the eyes 15 to which are pivoted the upper ends of the drag yoke 16.

The horizontal portion 17 of the drag yoke has projecting downward therefrom the teeth 18 adapted to contact with the road bed over which the vehicle may be traveling and thus hold the vehicle against skidding as will be readily understood.

19 represents a latch and this latch is pivoted at 20 to the chassis and has a tapered notch 21 formed therein for engagement with the horizontal portions 17 of the drag yoke so that when the drag yoke is elevated to the position shown in Fig. 1, this latch will engage therewith and it will be firmly held in position by the action of the spring 22 thereby causing the drag yoke when out of action to be carried entirely upon the chassis and preventing all tendency to chatter or rattle.

23 represents a rod which is pivoted at 24 to the latch and at 25 to the lever 26, said lever being pivoted at 27 by which arrangement the latch may be readily disengaged from the horizontal portion of the drag yoke by the driver simply pulling upon the hand lever, thus releasing said drag yoke and permitting it to swing downward and the teeth thereof comes in contact with the road bed for the purpose before explained.

In order that the drag yoke may be returned to its inactive position and engaged by the latch, I provide a cord or flexible cable 28 which is attached to the drag yoke as at 29 and passes over the pulleys 30 and 31 terminating in a hand hold or ring 32 within easy reach of the driver.

33 represents a spring hook which is secured to the steering wheel post 34 by means of the clip 35, said hook being so curved as to readily engage the ring 32 when the driver has drawn the drag yoke into its inoperative position so that when said ring is thus engaged, as shown in Fig. 1, it will remain in this position during the driving of the vehicle until it becomes necessary to put the drag yoke into action which as before described is readily accomplished by pulling upon the lever 26 which releases the latch allowing the yoke to swing downward. During this swinging motion, the yoke will pull upon the cord 28 with sufficient force to flux the spring hook 33 allowing the ring 32 to slip off said hook as will be readily understood.

34' represents a chain or flexible member, one end of which is attached to the drag yoke while the other end is attached to the spring 35, the latter in turn being attached to the clamping plate 36 which arrangement provides for limiting the rearward swing of the drag yoke and gives to the teeth of said yoke a yielding contact with the road bed when said yoke is in action.

This device is especially intended for use in case of emergencies upon icy and slippery roads and when the drag yoke has been dropped into active position, it will take a sufficient hold upon the road bed to prevent skidding of the vehicle or any tendency to turn sidewise and will have a considerable tendency to retard the forward movement of the vehicle even though the brakes should not hold.

Of course I do not wish to be limited to the exact details of construction as herein shown, as these may be varied within the limits of the appended claims without departing from the spirit of my invention.

Having thus fully described my invention, what I claim as new and useful is:—

1. In combination with a motor vehicle, shock absorbing springs carried by the side bars of the chassis of said vehicle, a drag yoke having its ends pivoted to said springs, a latch pivoted to the chassis and adapted to engage and hold the drag yoke in an inoperative position, a spring for swinging the latch in one direction, a rod for swinging said latch against the action of the last named spring, a lever to which said rod is pivoted for actuating the latter, a cord, one end of which is attached to the yoke, pulleys over which said cord runs, a hand ring attached to the free end of the cord and a spring hook mounted upon the steering post of the vehicle adapted to retain said ring in engagement therewith while the drag is in its inoperative position but to permit the withdrawal of said ring from said hook when the drag yoke is swung into its operative position.

2. In combination with a vehicle, shock absorbing springs carried by the side bars of the vehicle; a drag yoke having its ends pivoted to said springs, a latch pivoted to the chassis of the vehicle for holding and releasing the drag yoke; a spring for swinging the latch in one direction; a rod for swinging said latch in a reverse direction; and a lever for actuating the rod.

3. In combination with a drag yoke carried by a motor vehicle; a cord, one end of which is attached to said yoke; pulleys over which said cord runs; a hand ring attached to the free end of the cord; and a spring hook mounted upon the steering post of the vehicle for retaining said ring in engagement therewith while the drag is in inoperative position but permit the automatic withdrawal of said ring when said drag is brought into operative position.

In testimony whereof, I have hereunto affixed my signature.

LEWIS C. JONES.